United States Patent [19]

Dennehy, Jr. et al.

[11] Patent Number: 4,836,735
[45] Date of Patent: Jun. 6, 1989

[54] LOAD POSITIONING CONTAINER CHASSIS

[75] Inventors: Michael J. Dennehy, Jr., Dalton, Pa.; Robert A. Rials, Dayton, N.J.

[73] Assignee: XTRA Corporation, Boston, Mass.

[21] Appl. No.: 166,637

[22] Filed: Mar. 11, 1988

[51] Int. Cl.⁴ .................................................. B60P 1/00
[52] U.S. Cl. ........................ 414/475; 280/149.2; 414/478; 414/492; 414/679
[58] Field of Search ............... 414/475, 477, 478, 479, 414/491, 498, 434, 439, 679, 492; 280/80 B

[56] References Cited

U.S. PATENT DOCUMENTS

| | | | |
|---|---|---|---|
| 2,876,016 | 3/1959 | McClellan | 280/423 |
| 3,073,466 | 1/1963 | Greer et al. | 414/498 |
| 3,083,852 | 4/1963 | Lidstrom | 414/498 |
| 3,508,762 | 3/1968 | Pratt | 280/81 |
| 3,618,969 | 11/1971 | Glassmeyer | 280/80 B |
| 3,841,511 | 10/1974 | Haun | 214/516 |
| 3,884,158 | 5/1975 | Rumell | 414/679 |
| 3,989,266 | 11/1976 | Foster | 280/414 R |
| 4,049,289 | 9/1977 | Deckrow | 280/423 |
| 4,060,145 | 11/1977 | Kingman et al. | 280/106 |
| 4,061,353 | 12/1977 | Kingman et al. | 280/106 T |
| 4,101,144 | 7/1978 | Ross et al. | 280/423 B |
| 4,111,450 | 9/1978 | Pinto | 280/405 |
| 4,132,326 | 1/1979 | Pinto | 214/515 |
| 4,400,004 | 8/1983 | Arguin | 280/408 |
| 4,526,395 | 7/1985 | Arguin | 280/408 |
| 4,580,805 | 4/1986 | Bertolini | 280/405 A |
| 4,598,924 | 7/1986 | Arguin | 280/408 |
| 4,673,191 | 6/1987 | Arguin | 280/408 |

FOREIGN PATENT DOCUMENTS

| | | | |
|---|---|---|---|
| 3437854 | 4/1986 | Fed. Rep. of Germany | 414/498 |
| 1486894 | 9/1977 | United Kingdom | 414/475 |

*Primary Examiner*—Andres Kashnikow
*Assistant Examiner*—Michael J. Forman
*Attorney, Agent, or Firm*—Lahive & Cockfield

[57] ABSTRACT

A container chassis is supported at one end by a movable bogie unit or "slider" mounted below it, and has a sliding bolster unit mounted above it to accommodate a heavy twenty foot cargo container. Retractable roller mechanisms on the bogie unit and on the bolster unit are urged against the chassis to permit easy placement of a unit at a desired position along the chassis, and a releasable coupling between the slider and the bolster allows the bolster to be moved along the chassis by the slider. Protocols are described for moving a container between a first position centered on the chassis and a second position flush with the rear of the chassis. In a preferred embodiment, the front portion of the chassis is elevated with respect to the rear portion, so that the bolster slides along a region lower than the front. With the bolster in its rearmost position, the chassis accommodates a forty foot container.

6 Claims, 5 Drawing Sheets

LOAD POSITIONING CONTAINER CHASSIS

The present invention relates to a chassis for trucks, and more particularly to a container chassis which is adapted to carry a freight container having a loaded weight such that a chassis of greater length than the container is required to carry the container on roadways and bridges.

The requirement for a chassis of greater length than the container stems from the great weight of a loaded shipping container, and is imposed by the axle spacing and weight distribution limitations required under the bridging laws of the various states. It is clearly advantageous to be able to transport by roadway a maritime shipping container without unpacking and reloading the contents of the container. Nonetheless, prior art approaches to the use of a truck trailer chassis of a length greater than the shipping container all result in certain inefficiencies in loading ability, highway handling, or chassis structural complexity which detract from the advantages of being able to haul the sealed container.

For example, when one uses a conventional 40-foot chassis to haul a high-weight 20-foot container, the placement of the container centrally on the chassis to comply with bridging laws poses difficulties in unloading when the chassis is backed up to a conventional loading dock; further, the length of the chassis makes city driving difficult.

It has recently been proposed in U.S. Pat. No. 4,580,805 of Bertolini to provide a telescoping chassis using a sliding tandem which slides backwards to extend the chassis length, with the tandem being connected by gearing to a sliding container cradle in such a way that the cradle moves forward toward the center of the chassis as the tandem moves backward to extend the chassis length. The Bertolini device thus addresses the problems of load centering, container unloading, and axle spacing. This is accomplished, however, with a chassis of some structural and mechanical complexity which carries only a twenty-foot container. Various other constructions have been proposed in the art to accommodate cargo containers or to vary the axle spacing of a chassis. Examples of such containers are shown in U.S. Pat. Nos. 2,172,244; 3,508,762; 3,618,969; 3,841,511; 4,132,326; and 4,400,004.

SUMMARY AND OBJECT OF THE INVENTION

It is an object of the invention to provide a truck chassis for carrying high weight containers with ease of loading and unloading.

It is another object of the invention to provide a chassis for carrying high weight containers, which is adjustable to meet desired conditions of maneuverability or axle spacing and loading.

It is a further object of the invention to provide a truck chassis of simple yet rugged construction.

These and other objects of the invention are achieved in a long chassis supported at one end by a movable bogie unit or "slider", and having a sliding bolster unit mounted thereon. Retractable roller mechanisms on the bogie unit and on the bolster unit are urged against the chassis to permit easy placement of a unit at a desired position along the chassis, and a releasable coupling between the slider and the bolster allows the bolster to be moved along the chassis by the slider. Protocols are described for moving a container between a first position centered on the chassis and a second position flush with the rear of the chassis. In a preferred embodiment, the front portion of the chassis is elevated with respect to the rear portion, so that the bolster slides along a region lower than the front. With the bolster in its rearmost position, the chassis accommodates a forty foot container.

These and other features of the invention will be understood in part by reference to the drawings and in part from the following detailed discussion of a presently preferred embodiment of the invention.

DETAILED DESCRIPTION OF ILLUSTRATED EMBODIMENT

Figure 1:
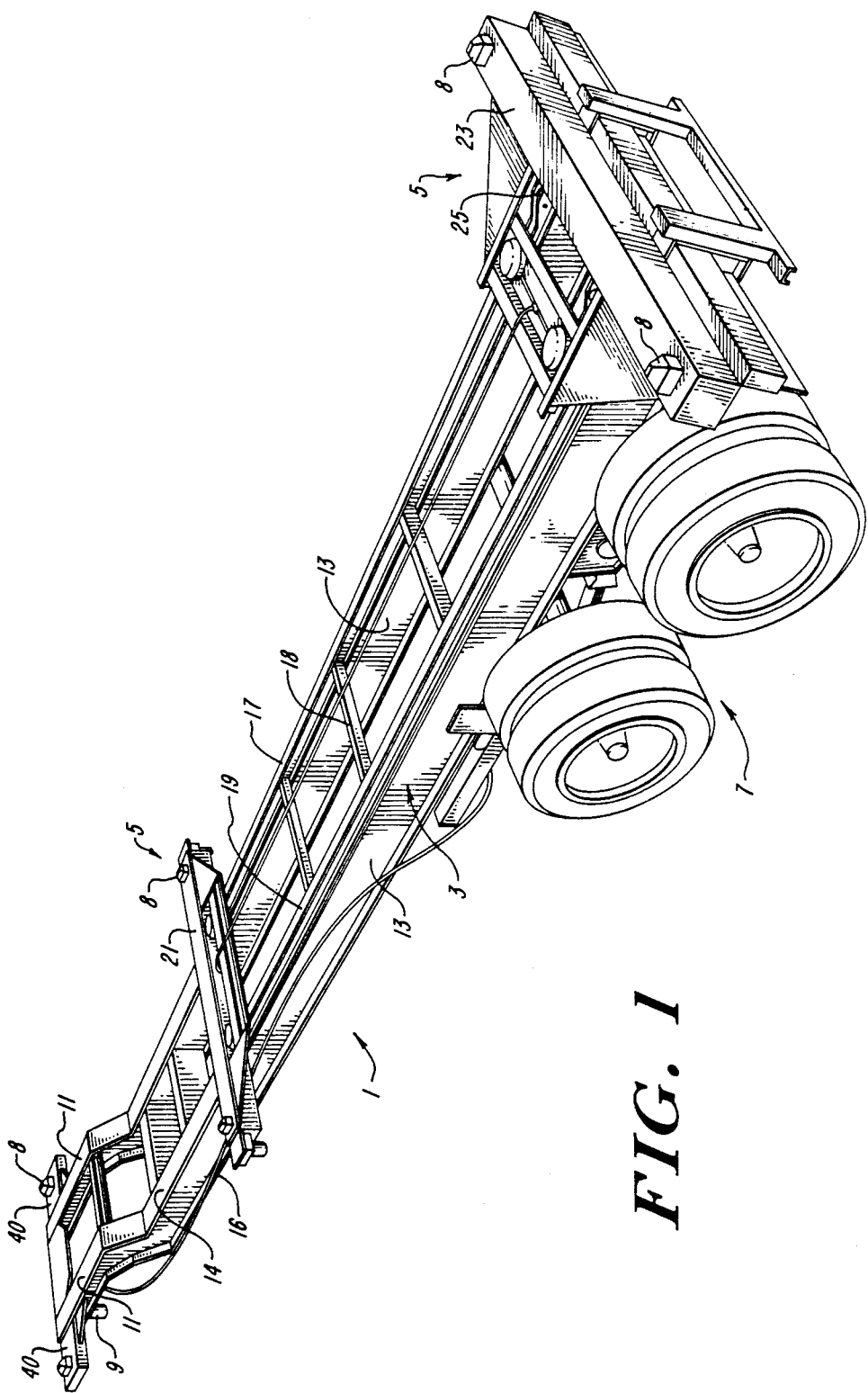
FIG. 1 is a perspective view of a chassis according to the present invention.

FIG. 1 is a perspective view of a presently preferred embodiment of a container chassis 1 according to the present invention, including a structural frame 3, a bolster assembly 5 for receiving the container, and a trailing wheel assembly or bogie 7.

As discussed in greater detail below, frame 3 is essentially formed as a forty foot gooseneck frame, with a front from which extend a pivot mounting 9 and a pair of structural arms 11 at a first level, followed by a pair of rearwardly extending main structural frame members 13 located at a lower level. As illustrated, rearwardly extending frame members 13 are formed of strong I-beams having upper and lower horizontal bearing surfaces 14, 16.

A tandem axle assembly 7 of the type known as a slider is positioned at the rear of the chassis and bears against lower bearing surface 16 to support the frame. Slider 7 has a latching mechanism of a conventional type, such as a spring loaded pin mechanism, which engages a corresponding feature on the structural frame member, to lock the slider at a desired position along the frame members. With the latch released, the slider is positioned along the frame by locking the slider brakes and moving the tractor to advance or back the chassis with respect to the stationary slider.

Bolster assembly 5 includes a frame-like sliding carriage formed of two parallel rails 17, 19 and respective front and back end supports 21, 23, with a plurality of cross pieces 18, the foregoing members together defining a rectangular carriage for receiving and securing a cargo container thereon. The entire bolster assembly 5 slides on the parallel upper bearing surfaces 14 of the I beams, and, like the slider, has latching members for securing the bolster at any of a number of different positions along the frame members 13, 15. The end supports 21, 23 are provided with conventional twist-locking pin connectors of the type commonly used for securing a container to a transporter, and a further set of connectors, which may be similar, are provided for latching the bolster to frame members 13, 15. Positioning blocks 8 of conventional type align a container on the bolster.

Both the slider assembly 7 and the sliding bolster assembly 5 are provided with power actuated retractable roller mechanisms 25, 29 at their four corners for temporarily bearing the load to permit moving one or both assemblies along the frame. In addition, a latching structure (discussed below) is provided for temporarily latching the bolster directly to the slider to move the bolster with the slider.

Figure 2A:
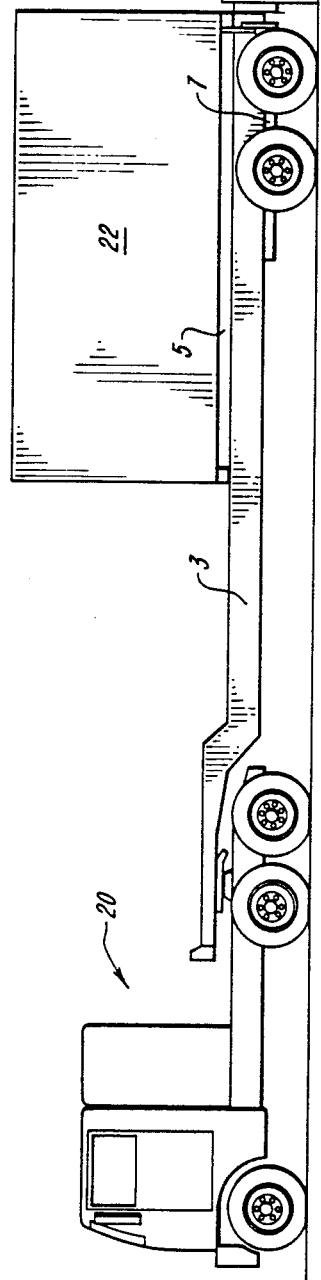
FIGS. 2A-2D show operation of the chassis.
Figure 2B:
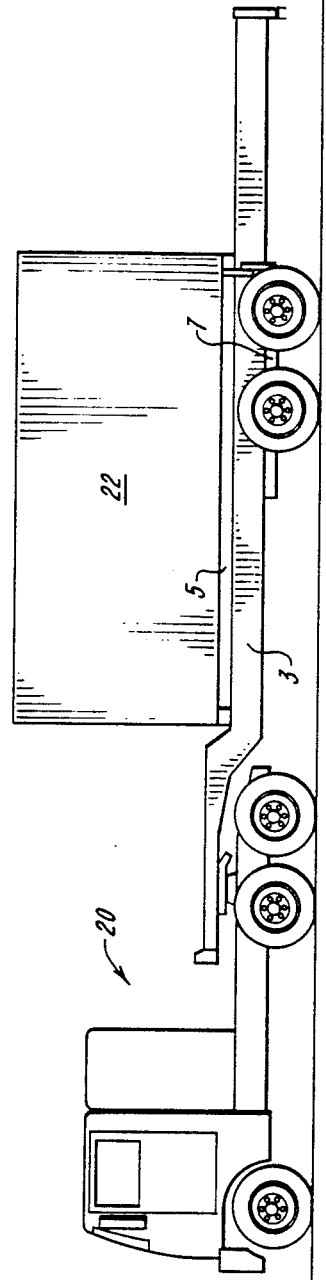
Figure 2C:
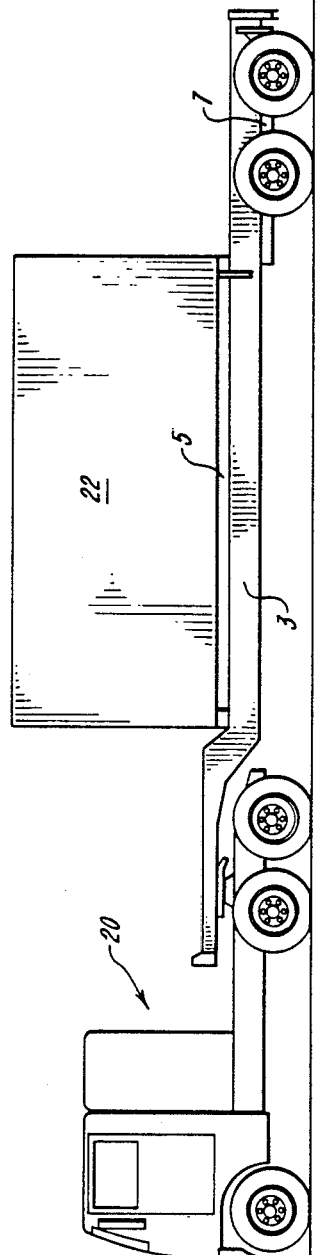
Figure 2D:
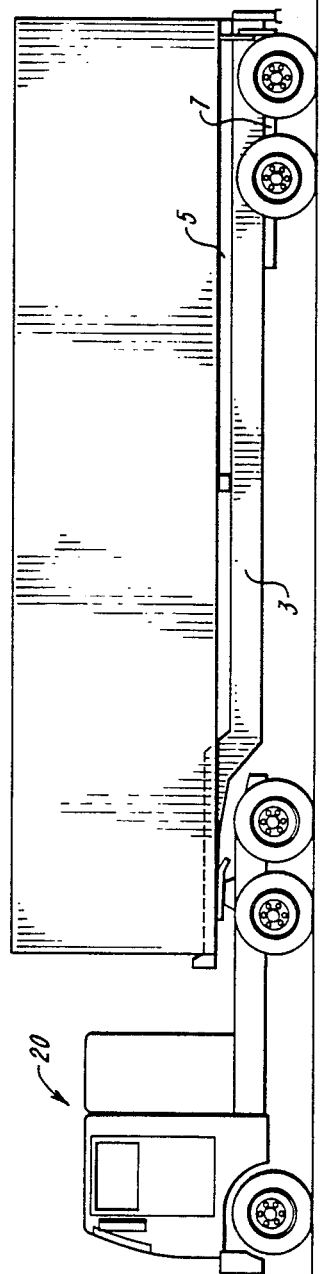

FIGS. 2A–2C show views of a chassis attached to a tractor 20 and having a container 22 thereon in various positions for loading, positioning of the container, or highway travel.

In FIG. 2A both the slider and the bolster are positioned at the rear of the chassis, with the container sitting thereon. In this position, the chassis may be backed up to an elevated loading dock, the container end panel may be opened, and the contents of the container may be unloaded in a conventional manner with a fork lift or other warehouse equipment. Similarly, with the bolster in this position, a container may be lifted onto or off of the chassis using a wide variety of conventional container lifting set-ups.

In FIG. 2B both the slider and the bolster having been moved to a central position along the chassis. This position is achieved starting from the position of FIG. 2A as follows. First, the slider is coupled to the bolster by latching the positioning latch (27, FIG. 3) so that the two assemblies will move in unison. Next, the brakes of the slider are set on, e.g., by switching off the pneumatic lines to the brakes. Then the retracted roller assemblies 25 of the bolster and 29 of the slider are actuated to force the roller sets of each assembly against the respective bearing face 14 or 16 of the chassis frame. The tractor 20 is then backed up, pushing the chassis body through the rollers until the bolster 5 and container 22 are located at the desired position. The bolster rollers are then retracted, and the twist-lock pins or other locking mechanism of the bolster are then set to securely fasten the bolster in the selected location on the frame.

When the load is to be carried along a route free of bridges, and where the total load born by an axle is not of concern, the slider rollers may also be retracted and the slider 7 locked in the central position shown in FIG. 2B. This results in a chassis having a relatively short wheelbase and a high degree of maneuverability, such as may be necessary for driving in city traffic. However, for highway or bridge traffic, the slider is moved partly or all the way to the rear of the chassis, as shown in FIG. 2C.

This is accomplished as follows. After the bolster has been moved to a central position and locked in position, the positioning latch 27 connecting it to the slider 5 is released. With the slider rollers 29 still in their weight-bearing actuated position, the tractor 20 is then driven forward to pull the chassis 3 so that the slider 7 assumes a new position at the desired axle spacing, and the rollers 29 are then retracted. The slider 7 is then locked to the frame for highway driving.

Figure 3:
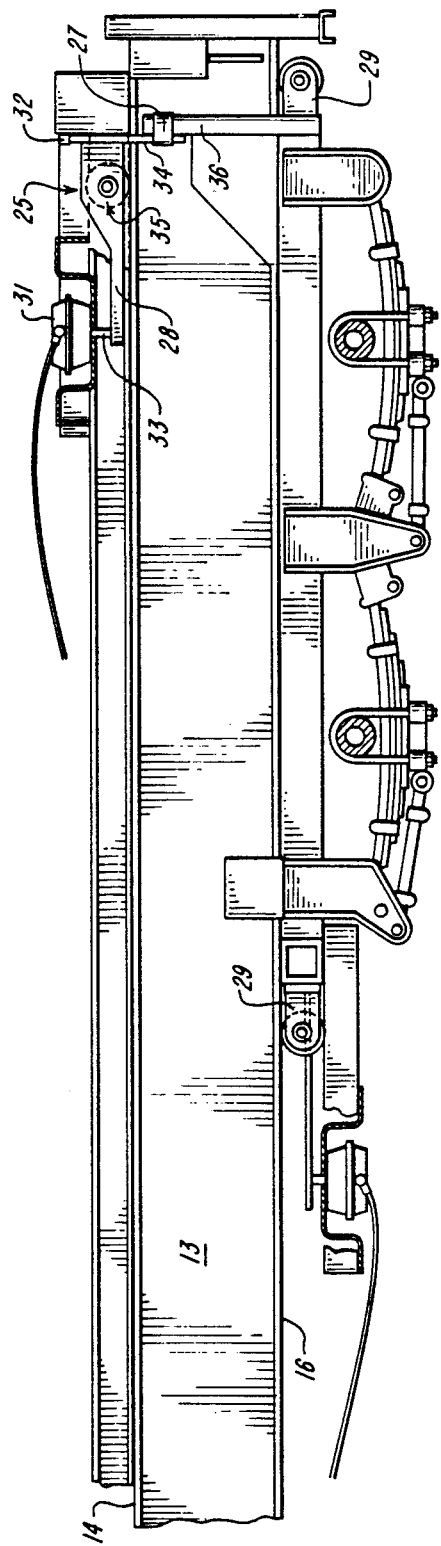
FIGS. 3 and 4 are elevations, partly in phantom, showing retractable roller assemblies of a preferred embodiment.

FIG. 3 shows details of the construction of the preferred embodiment. As shown in partial cutaway, a retractable lifting assembly 25 of the bolster includes a roller 35 mounted on floating L-shaped bracket 37. A long arm 28 of the bracket extends in one direction to an air pancake 31 or pneumatic actuating assembly which pushes an actuating shaft 33 to push down arm 28. This brings roller 35 into contact with frame surface 14 and causes the member 29 to pivot about the shaft of the roller. This raises up the short end 30 of member 29, so that it bears against a weight bearing protrusion 32 of the bolster, thereby raising the corner of the bolster and transferring the weight of the bolster to the roller 35.

With the bolster 5 thus raised by roller assemblies it may be readily moved to a desired position along the chassis. Similar retractable roller mechanisms 29 are mounted in an inverted orientation on the slider, and are operative to lift the chassis from the slider and provide a rolling contact therebetween.

Also shown in FIG. 3 is one form of latch mechanism contemplated for coupling the slider 7 to the bolster 5 to perform load positioning. A bar 34 rigidly affixed to the side of the bolster extends downwardly past the frame, and a spring loaded hook-shaped latch 27 mounted on a post 36 extending upwardly from the slider latches the bar 34 to prevent motion of the bolster either forwardly or rearwardly with respect to the slider.

Figure 4:
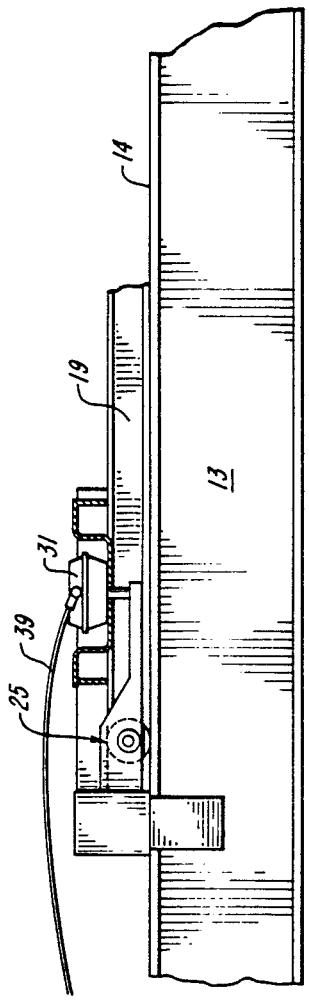

FIG. 4 is an elevation of a portion of the chassis and bolster. A retractable roller assembly 25 identical to the above-described rear bolster roller assembly is shown partly in phantom. For purposes of illustration, a pressure hose 39 is shown connected to the roller activating pancake 31, although in practice the four pancakes 31 will be interconnected by rigid pressure lines mounted on the walls of the bolster frame, and a single quick connect coupling to the bolster will actuate all four roller assemblies.

Figure 5:
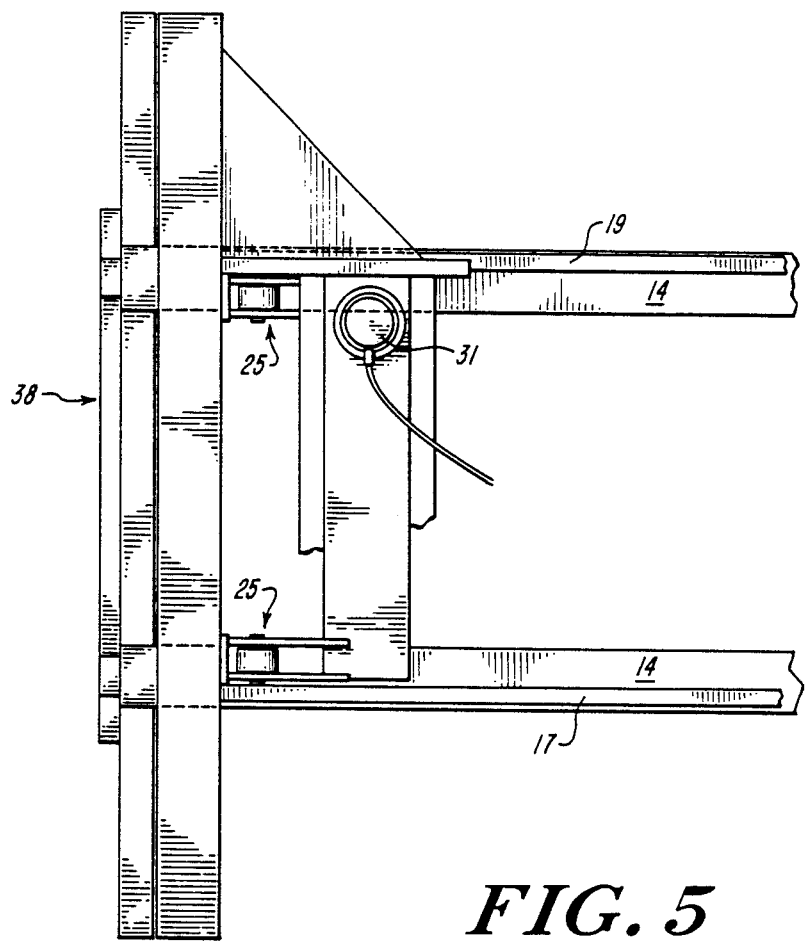
FIG. 5 is a partial top plan view of the bolster showing its roller assemblies.

FIG. 5 is a top plan view of the rear portion of the chassis 3, showing end support 23, side rails 17, 19 and the roller assemblies 25 with actuating mechanism 31 mounted on a cross member of the bolster. The bolster slides on the upper surface 14 of the chassis, and can move from a position flush with the rear bumper assembly 38 of the chassis, forwardly.

In the illustrated embodiment, flexibility in load carrying ability is further provided by a front cross member 40 illustrated in FIG. 1. Member 40 is positioned at the level of the top of bolster 5 so that a single forty foot cargo container may be mounted on the chassis and rest thereon in lieu of a variably positioned twenty foot overweight container. When the chassis is to carry a forty foot container, the front locking pins of the bolster are pivoted to a position clear of the top surface of the bolster for clearance, and the slider may be positioned somewhat forward of its rearmost position.

It will be appreciated that in its broad structure the described chassis is well adapted to carry a short overweight freight container (i.e., a container weighing over 20 tons and having a length of twenty feet), while complying with the requirements of bridging laws and still permitting a high degree of maneuverability for local driving and ease of container access for loading or unloading. The unique construction allows independent motion of a bolster and slider. Further, the unique load bearing and bolster-moving construction provides a hardy structure which is well adapted to bear the described heavy loads without succumbing to local structural stresses or undue wear.

The invention has been described for purposes of illustration with reference to one illustrated preferred embodiment. It will be apparent, however, that the particular details thereof may be varied without departing from the spirit and scope of the invention. With this description, variations and modifications of the invention will occur to those of reasonable skill in the art, and all such variations and modifications are included within the scope of the invention, as defined by the following claims.

What is claimed is:

1. A chassis for carrying a short overweight freight container, such chassis comprising a structural frame longer than the container, and having a front mounting member for coupling to a tractor and a pair of frame members extending rearwardly from the front mounting member, a bolster assembly dimensioned to receive and hold a said container securely thereon, said bolster assembly being slideably mounted for motion back and forth on a rearward portion of said frame members, an axle assembly movably mounted beneath and supporting said frame members, said axle assembly being adapted for slideable movement along the frame members to permit placement at a desired axle spacing for a particular load, and first and second power assisted means engaging said axle assembly and said bolster assembly, respectively, for temporarily transferring the load between the frame members and each said assembly to a respective friction-reducing load bearing mechanism so that each said assembly may be conveniently moved and repositioned along said frame member to achieve desired load location and axle spacings before securing said bolster assembly and said axle assembly to said frame members.

2. A chassis according to claim 1, further comprising means for latching said axle assembly to said bolster assembly to move the bolster with respect to said frame members to the desired load location.

3. A chassis according to claim 2 wherein the structural frame is a forty foot gooseneck frame and wherein the bolster assembly is dimensioned to hold a container shorter than forty feet, and is located at an elevation on said rearwardly extending frame members such that a forty foot container may be loaded onto said frame and engage front and rear portions of the chassis over the bolster.

4. A chassis according to claim 3, wherein a said power assisted means comprises a roller assembly and a fluid pressure actuation system which moves the roller assembly into a load bearing position for rolling a said bolster or axle assembly along said frame members.

5. A chassis for carrying freight containers, comprising a frame extending to a fixed rear end, a bolster assembly movably mounted on a rearward portion of the frame for motion along said frame forwardly of said rear end, said bolster assembly having a length approximately one-half the length of the frame, a wheel assembly mounted at the rearward portion of the frame and movable to support the frame at a selectable position along the frame forwardly of said rear end, means for releasably latching said wheel assembly to said bolster assembly to drag the bolster assembly to a desired position on said frame as the chassis is moved, and means for latching each of said wheel assembly and said bolster assembly to the frame in fixed positions for driving said chassis on the highway.

6. A chassis according to claim 5, further comprising a plurality of retractable roller assemblies, and means for urging said roller assemblies into a load bearing position to permit placement of said bolster assembly and said wheel assembly in desired positions along said frame.

* * * * *